United States Patent
Zanaty

(10) Patent No.: US 6,741,685 B1
(45) Date of Patent: May 25, 2004

(54) BILLING SYSTEMS AND METHODS FOR COMMUNICATION NETWORKS PROVIDING DIFFERENTIATED SERVICES

(75) Inventor: Farouk M. Zanaty, Loveland, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 105 days.

(21) Appl. No.: 09/672,598

(22) Filed: Sep. 29, 2000

(51) Int. Cl.[7] .............................................. H04M 15/00
(52) U.S. Cl. ............................. 379/114.01; 379/114.03; 379/114.05; 379/112.01; 379/114.28; 379/114.29; 379/115.01; 379/121.01; 379/133
(58) Field of Search ....................... 379/112.01, 112.06, 379/114.01, 114.03, 114.05, 114.06, 115.01, 119, 133, 114.07, 114.08, 114.1, 114.28, 114.29, 115.02, 116, 120, 121.01, 219, 220.01, 221.02, 221.07, 221.08, 221.15, 222; 705/52, 400; 370/351, 352

(56) References Cited

U.S. PATENT DOCUMENTS

| 5,008,929 | A | | 4/1991 | Olsen et al. ................. 379/112 |
|---|---|---|---|---|
| 5,768,353 | A | * | 6/1998 | Browne ................. 379/114.01 |
| 5,991,378 | A | * | 11/1999 | Apel ..................... 379/114.01 |
| 5,999,604 | A | * | 12/1999 | Walter ....................... 379/133 |
| 6,205,211 | B1 | * | 3/2001 | Thomas et al. ......... 379/114.01 |
| 6,259,778 | B1 | * | 7/2001 | Corwith ................. 379/115.01 |
| 6,327,350 | B1 | * | 12/2001 | Spangler et al. ....... 379/115.01 |
| 6,338,046 | B1 | * | 1/2002 | Saari et al. .................. 705/34 |
| 6,373,817 | B1 | * | 4/2002 | Kung et al. ................. 370/217 |

OTHER PUBLICATIONS rfc2474, http://www.cis.ohio–state.edu/htbin/rfc/rfc2474.html, pp. 1–17.
rfc–Assured Forwarding PHB Group, http://www.faqs.org/rfcs/rfc2597.html, pp. 1–8.
rfc2598–An Expedited Forwarding PHB, http://www.landfield.com/rfc/rfc2598.html, pp. 1–8.

* cited by examiner

Primary Examiner—Curtis Kuntz
Assistant Examiner—Quoc Tran

(57) ABSTRACT

A preferred method for billing for utilization of a communications network includes receiving routing information corresponding to routing of data via the communications network. Thereafter, the routing information may be correlated with a transaction model and billing information may be generated based upon the correlated information. Systems and computer readable media also are provided.

6 Claims, 7 Drawing Sheets

BILLING SYSTEMS AND METHODS FOR COMMUNICATION NETWORKS PROVIDING DIFFERENTIATED SERVICES

BACKGROUND OF THE INVENTION

1. Field of the Invention

The present invention generally relates to communications networks and, in particular, to systems and methods for facilitating compilation of data routing information for data transmitted via a communications network.

2. Description of the Related Art

The introduction of high-speed routers, commonly referred to a "class routers," enables transactions conducted over communications networks, e.g., the Internet, to be classified in various categories. Some of these categories may describe the manner in which a transaction is to be treated at a routing point, which is facilitated by a class router, for example. For instance, differentiated data delivery service may be provided so that different priority levels may be assigned to the contents of transactions appearing at a routing point within a class router. So provided, providers of communications network services, such as Internet service providers (ISP's), may utilize these priority levels to impose differentiated service charges to the originating sources or destination beneficiaries of these transactions based upon the designated priority level. Heretofore, however, billing procedures relating to the aforementioned differentiated services have not been addressed.

Therefore, there is a need for improved systems and methods which address these and other shortcomings of the prior art.

SUMMARY OF THE INVENTION

Briefly described, the present invention relates to communications networks and, more specifically, to systems and methods for facilitating compilation of routing information for data transmitted via such a communications network. Preferably, the communications network enables communication between sources and destinations by providing differentiated services to users. So provided, data associated with various users may be routed at various priorities, which may be based upon rate of data transfer, reliability, etc., through the network. As some embodiments of the present invention may be construed as providing methods for billing for utilization of a communications network, a preferred such method includes receiving routing information corresponding to routing of data via the communications network. Thereafter, the routing information may be correlated with a transaction model and billing information may be generated based upon the correlated information.

Some embodiments of the present invention may be construed as providing billing systems. In this regard, a preferred billing system includes a billing records system communicatively coupled to a communications network and which is configured to receive routing information. The billing records system also incorporates a transaction model and is further configured to con-elate the routing information with the transaction model so that billing information may be generated based upon the correlated information.

An alternative embodiment of the billing system includes means for receiving routing information, means for correlating the routing information with a transaction model, and means for generating billing information based upon the routing information correlated with the transaction model.

Other embodiments of the present invention may be construed as providing computer readable media. In this regard, a preferred computer readable medium embodiment includes a computer program which incorporates logic configured to receive routing information, logic configured to embody a transaction model, logic configured to correlate the routing information with the transaction model, and logic configured to generate billing information based upon the routing information correlated with the transaction model.

Other features and advantages of the present invention will become apparent to one with skill in the art upon examination of the following drawings and detailed description. It is intended that all such features and advantages be included herein within the scope of the present invention, as defined in the appended claims.

BRIEF DESCRIPTION OF THE SEVERAL VIEWS OF THE DRAWINGS

The present invention, as defined in the claims, can be better understood with reference to the following drawings. The drawings are not necessarily to scale, emphasis instead being placed on clearly illustrating the principles of the present invention.

DETAILED DESCRIPTION OF A PREFERRED EMBODIMENT

Figure 1:
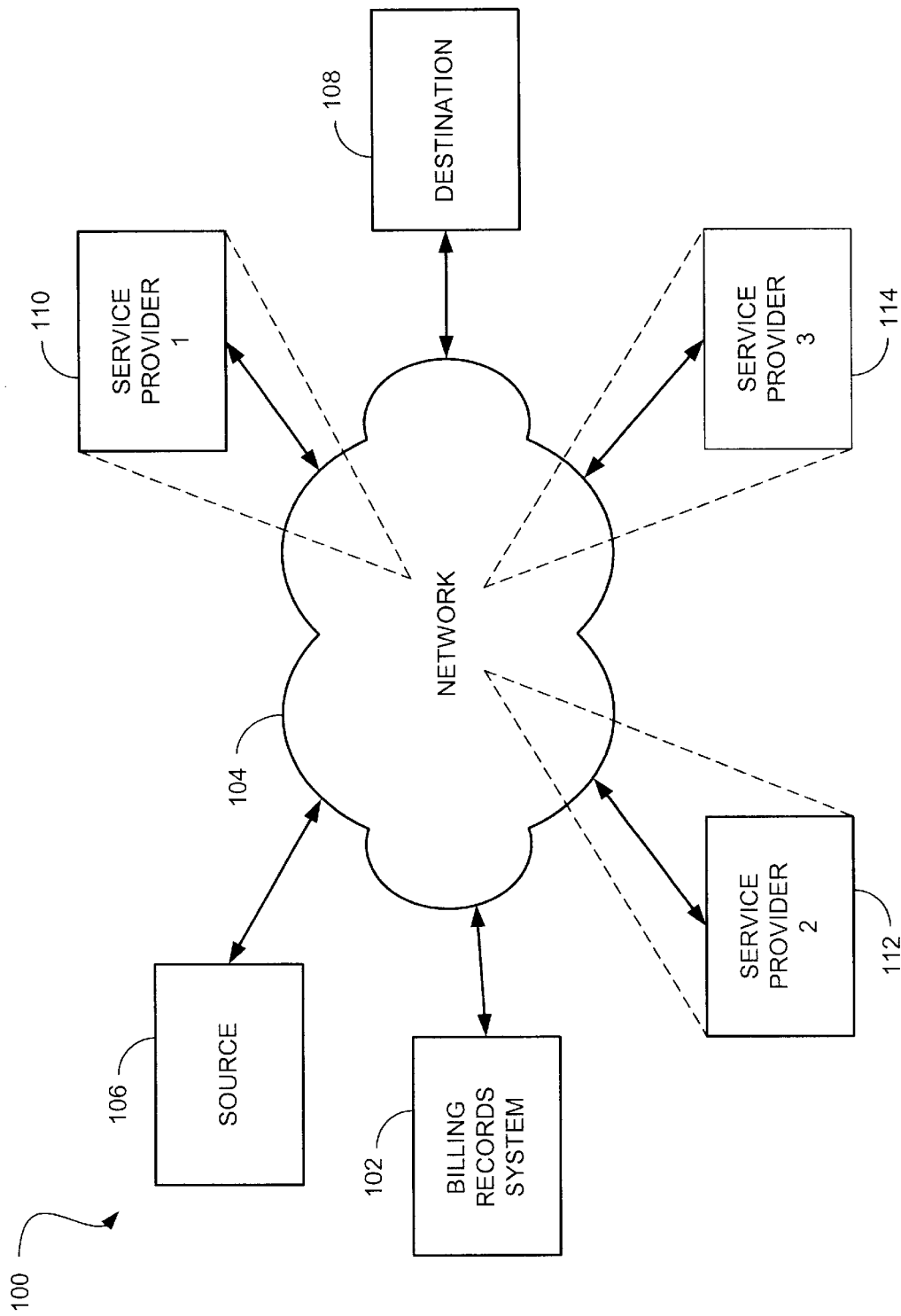
FIG. 1 is a schematic diagram depicting a preferred embodiment of the present invention.

Reference will now be made in detail to the description of the invention as illustrated in the drawings with like numerals indicating like parts throughout the several views. As shown in FIG. 1, a preferred embodiment of the billing system 100 of the present invention includes a billing records system 102 that is configured to communicate with a communications network 104, e.g., the Internet, WAN, LAN, among others, and/or various combinations thereof. As utilized herein, the term "Internet" is used to refer to the worldwide collection of networks and gateways that use the TCPIP suite of protocols to communicate with one another, and the term "LAN," an acronym for a local area network, is used to describe a grouping of computers and/or other devices that are disbursed over a relatively limited area and are interconnected so that any device typically is able to interact with any other device of the network. Additionally, the term "WAN," an acronym for wide area network, is used to denote a communications networks that interconnects geographically separated areas, such as areas separated by a distance greater than one mile.

Communications network 104 facilitates communication between various entities, such as between a source 106 and a destination 108. For example, and not for the purpose of limitation, each of the aforementioned entities may utilize a workstation, PC, Internet access device, server, messaging system or any of various other devices and/or components that arc adapted to facilitate communication via a communications network. Delivery of data, which may be in the form of data packets, for example, to and from the various entities may be facilitated by the communications network 104 by one or more service providers, e.g., service providers 110, 112 and 114, among others. For example, and not for the purpose of limitation, each of the aforementioned service providers may be an Internet service provider, a router provider, and/or a switch provider, among others. Thus, each of the various service providers contributes one or more components, e.g., hardware, and/or services, e.g., Web site hosting, to the communications network.

Figure 2:
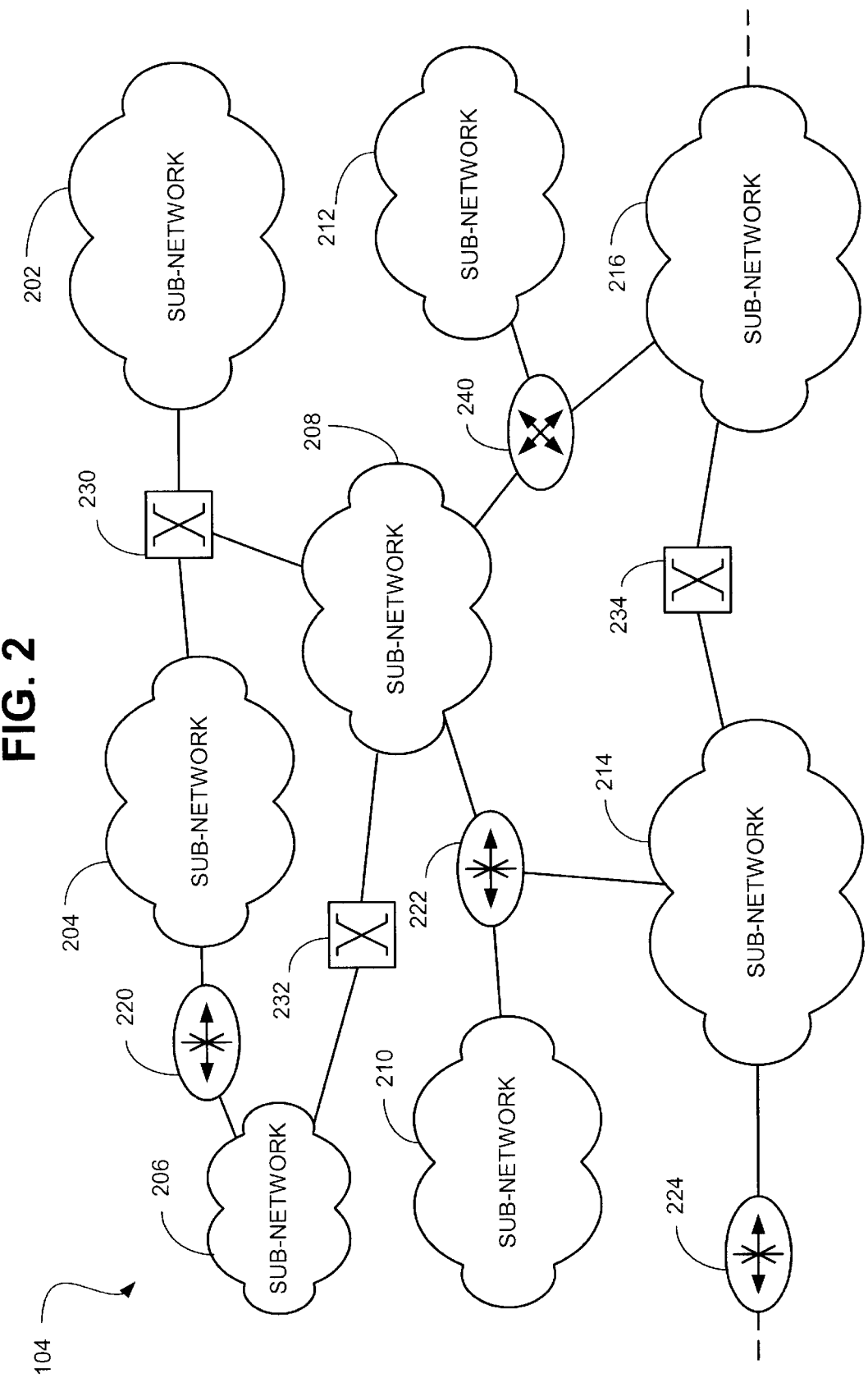
FIG. 2 is a schematic diagram showing detail of a representative communications network.

Referring now to FIG. 2, configuration of a representative portion of a communications network will be described in greater detail. As depicted in FIG. 2, a communications network, such as network 104, for example, incorporates various sub-networks, e.g., LANS, WANS, etc., such as sub-networks 202, 204, 206, 208, 210, 212, 214 and 216. The various sub-networks are communicatively coupled via various components such as routers, e.g., routers 220, 222 and 224, switches, e.g., switches 230, 232 and 234 and bridges, e.g., bridge 240. As utilized herein, the term "router" is defined as a intermediary device of a communications network that facilitates message delivery. For instance, in a network linking devices through a mesh of possible connections, a router is configured to receive transmitted messages and forward the messages to their intended destinations. Additionally, in an interconnected set of LANs, a router may serve the function of acting as a link between the LANs, thereby enabling messages to be sent from one to the other of the lands. Additionally, the term "switch" is used to define a device that controls routing operations of a signal path, and the term "bridge" is used to denote a device that connects networks using the same communications protocols so that information can be passed from one to the other of the networks, as well as a device that connects two LANs, whether or not they use the same communications protocols.

The various constituent sub-networks and components of the communications network cooperate so as to enable the routing of data, such as in the form of packets or frames, for example, to their intended destinations. Typically, such routing of data is accomplished in accordance with information which is carried by the frames. It should be noted that communication networks may utilize different transmission or transportation methods for delivering data in the form of bits, bytes, octets, frames and/or packets. Similarly, such a network may utilize various transmission media, such as, but not limited to, copper wire, fiber optics, and/or wireless, among others, and may utilize various switching mechanisms including, but not limited to, Asynchronous Transfer Mode (ATM) and transportation media, such as Synchronous Optical Network (SONET), among others. All of the various communication, transportation, and/or transmission methods, components, mechanisms and media are considered well within the scope of the present invention.

Figure 3:
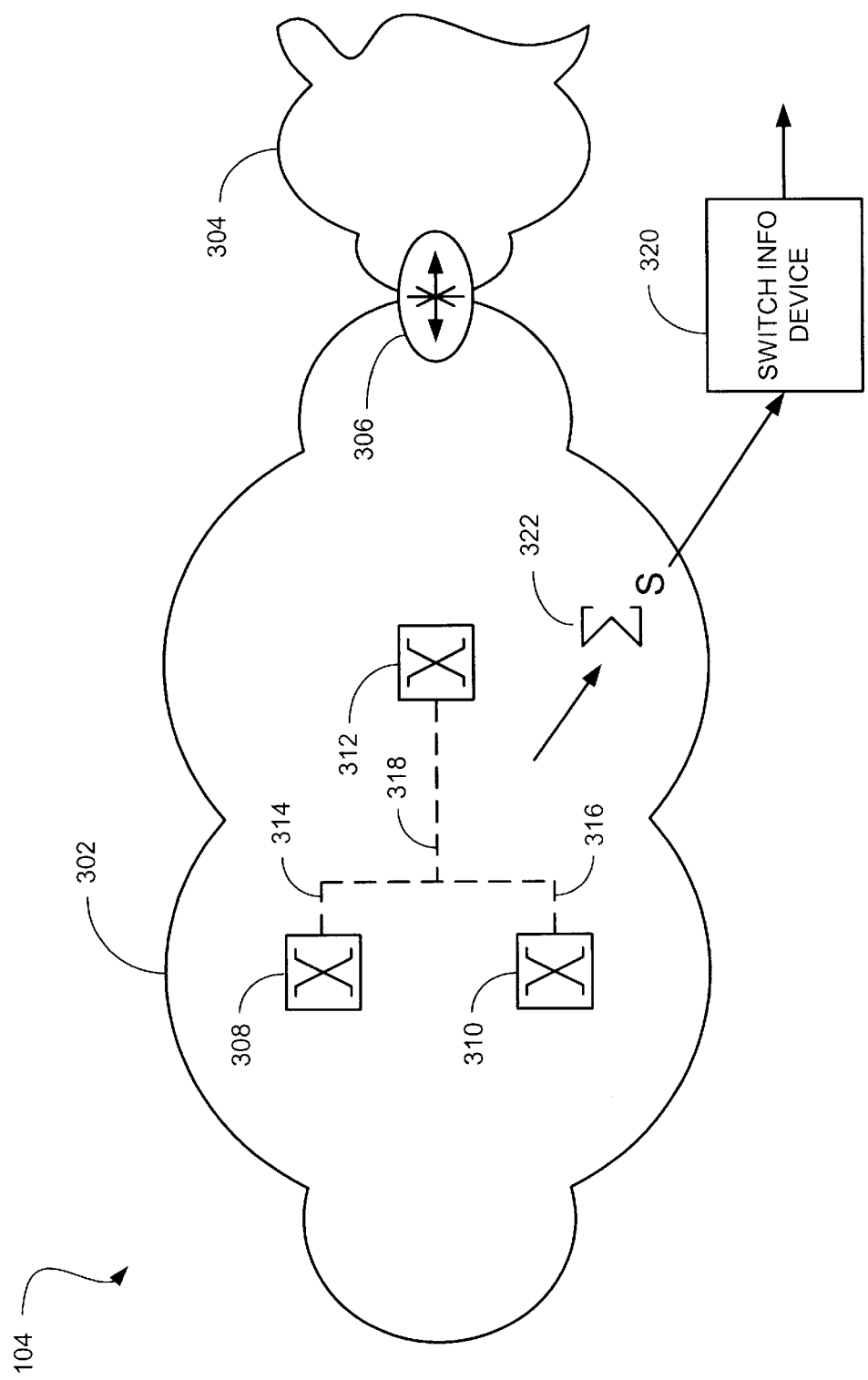
FIG. 3 is a schematic diagram depicting generation of switch billing information.

As depicted in FIG. 3, a representative portion of a communications network 104 may include a sub-network 302 that is connected to an additional sub-network 304, such as via class router 306. Routers, such as class router 306, are configured to receive data, e.g., data packets, via input ports and route the data packets via output ports. While being routed by a router, the data packets are stored in buffers of the router at a priority which corresponds to the differentiated service subscribed to by the user, e.g., the sender of the data. Thus, the router, in response to the designated priorities of the data packets, outputs the data packets preferably in a manner consistent with the respective priorities. For instance, the highest priority data may be output at a higher rate than the output rates of other received data.

Sub-network 302 also may include various switches, such as switches 308, 310 and 312, for example, with the various switches being interconnected via various transmission media, such as transmission lines 314, 316 and 318, for example. Preferably, a switch information collection device 320, such as a server, for example, is communicatively coupled with the sub-network 302 and, more specifically, to the various switches thereof. So provided, the switch information device 320 may collect switch information, i.e., information corresponding to the routing of data routed via the various switches.

Figure 4:
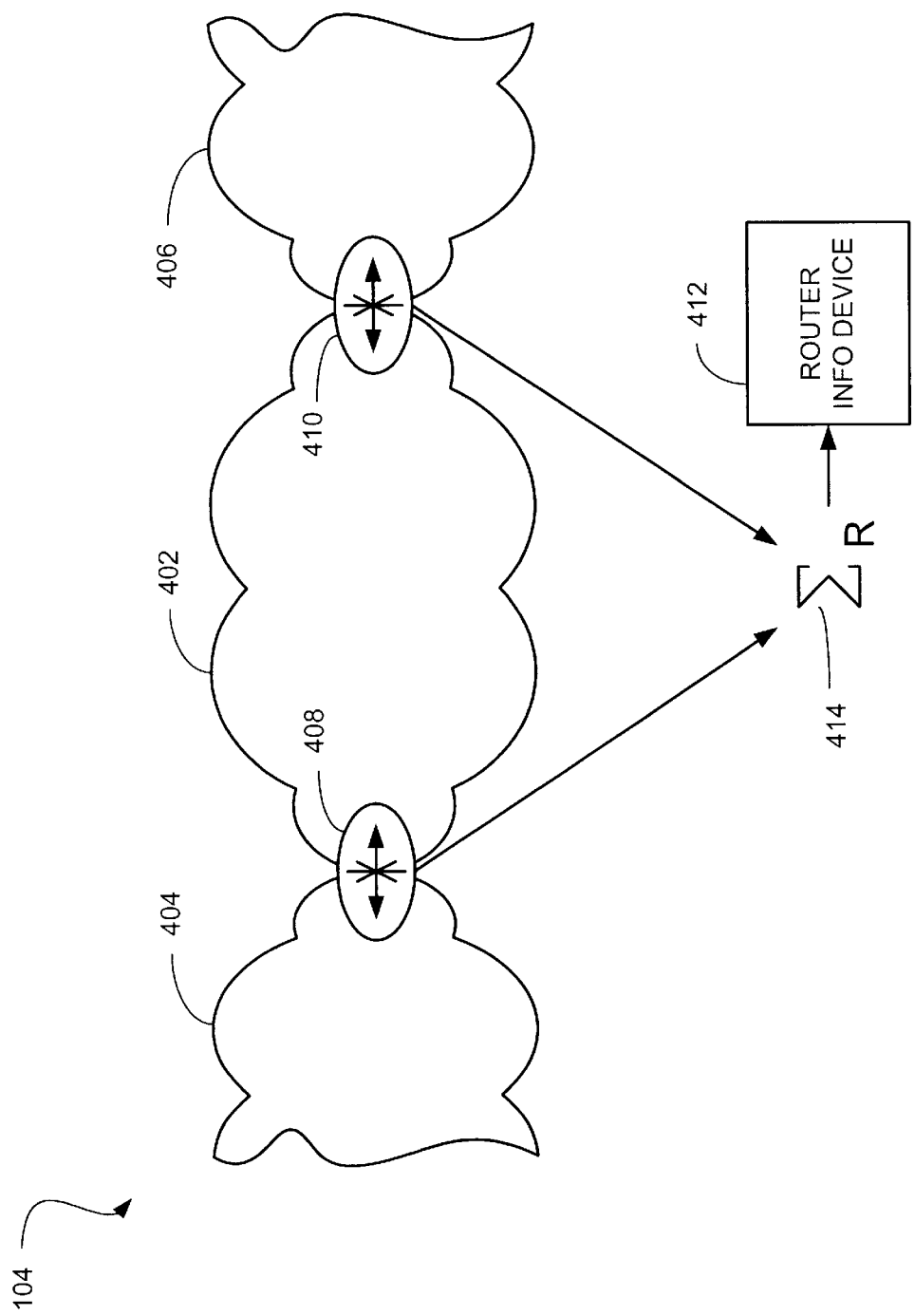
FIG. 4 is a schematic diagram depicting generation of router billing information.

As depicted in FIG. 4, communications network 104 may include multiple sub-networks, such as networks 402, 404 and 406, for example, that are interconnected via routers, e.g., router 408 and 410. Additionally, a router information device 412, such as a server, for example, may be provided which is communicatively coupled with one or more of the various routers. The router information device is adapted to receive router information, i.e., information corresponding to the routing of data via the various routers.

Figure 5:
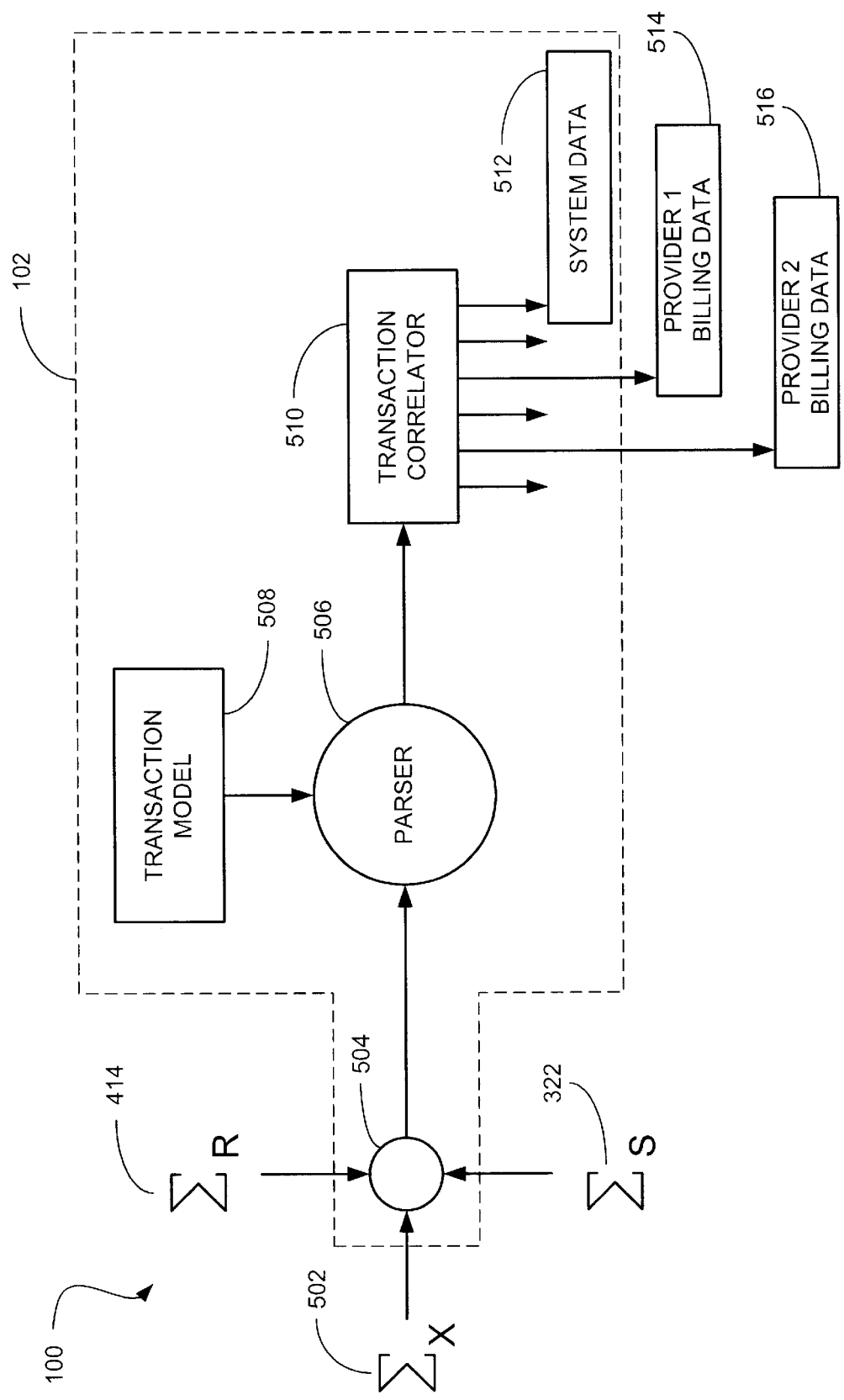
FIG. 5 is a schematic diagram depicting a preferred embodiment of the present invention.

Referring now to FIG. 5, a preferred embodiment of the billing system 100 will be described in greater detail. As depicted therein, billing system 100 includes billing records system 102 which is adapted to receive various routing information. The routing information may correspond to the particular route utilized by a communications network in delivering one or more packets of data as well as other information pertaining to differentiated services provided along the particular route. For example, the routing information may include switch information 322, e.g., information provided by a switch information device, router information 414, e.g., information provided by a router information device, and/or other differentiated service information 502. Such routing information is provided to the billing record system 102 via one or more inputs 504. Routing information received at the input 504 is provided to a parser 506 which is adapted to receive the information and validate the information against a transaction model 508. As a result, parser 506, in cooperation with the transaction model 508, preferably produces individual data fields that may be combined in one of various predefined formats, such as via a transaction correlator 510, for example, so that various billing data records may be generated.

The billing data records may be utilized for generating billing detail records for various entities, such as service providers. In turn, information contained in a billing detail record, or the billing detail record itself, may be utilized by a service provider for performing various functions. For instance, a service provider may utilize the information to identify potential equipment problems, e.g., the information may indicate an increased fault rate at a particular router. Alternatively, a service provider may utilize the information to bill its customers. For example, and not for the purpose of limitation, billing detail records may be constructed based on at least one of the following information: originating Internet protocol address; destination Internet protocol address; Internet protocol address of all routers used between the origin and destination; router table entries and categories used in all routing of related packets that constitute a fill transfer of unidirectional, bidirectional or multiple dialogs that are terminated by either the originating sender or the distant receiver; time stamps of every packet to be routed and the router Internet protocol address; type of service that includes, but is not limited to, minimum delay (latency), maximum throughput, maximum reliability, minimum cost, or normal; differentiated service indicators as specified by the service arrangement of every router used in all transactions, including but not limited to, the Per-Hop (forwarding) behavior that can be based on Best Effort, such as described in RFC 2474, Expedited Forwarding, such as described in RFC 2598, or Assured Forwarding, such as described in RFC 2597 (the aforementioned RFC documents are "Review for Comment" documents issued by the Internet Engineering Task Force (IETF) and are incorporated by reference herein); level of preferred service and priority level as specified by the service arrangement of every router used in all transactions; duration of all packet transfers within every router; termination cause of every completed transaction; reference to formula used in the billing record; the monetary or non-monetary charged to the client that originated all transactions or to subsequent clients if router tables are used to replace the entity of the client; reference to access lists that "allowed" or "denied" all or part of the transaction records to be/from being routed; reference to protocols used between routers in the same autonomous system and/or between boarder routers; Per-Hop forwarding behaviors; and implementation of access lists within the routing engine that result in allowing or denying specific traffic to be routed, among others.

As mentioned hereinbefore, the billing record system parser preferably cooperates with a transaction model. The transaction model incorporates one or more formulas that are utilized for generating various records. For example, a billing formula is utilized for generating a billing record. Although various billing formulas may be utilized by the transaction model, it is anticipated that preferred embodiments of the present invention may incorporate at least one of the following parameters in a billing formula: throughput value, loss rate of data, latency, and reliability. In this regard, throughput value is defined as the rate of data transfer within a switching or routing engine. Therefore, as throughput value increases, i.e., as the rate of data transfer within the switching or routing engine increases, it is expected that more charge may be applied in the billing formula. In regard to loss rate of data, as the loss rate of data decreases, typically, the more charge may be applied in the billing formula. It should be noted that data loss rate may be referred to as packet or cell loss rate, which, in a "perfect" communication network should be null; however, for practical reasons, there may be some unexpected losses that can be measured over time by the loss rate. In regard to latency, latency refers to the delay within a switching or routing engine. Therefore, in some embodiments, it is anticipated that the higher the latency within the switching or routing engine, the less charge may be applied in the billing formula, and vice versa. Similarly, in regard to reliability, the less reliable the switching or routing engine, the less charge may be applied, in preferred embodiments, in the billing formula. As mentioned hereinbefore, various other parameters also may be utilized.

Embodiments of the present invention may be implemented in hardware, software, firmware, or a combination thereof. In a preferred embodiment, however, the billing system is implemented as a software package(s), which can be adaptable to run on different platforms and operating systems as shall be described further herein. In particular, a preferred embodiment of the billing system, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device.

The computer readable medium can be, for example, but is not limited to, an electronic, magnetic, optical, electromagnetic, infrared, or semi-conductor system, apparatus, device, or propagation medium. More specific examples (a non-exhaustive list) of the computer-readable medium would include the following: an electrical connection (electronic).having one or more wires, a portable computer diskette (magnetic), a random access memory (RAM) (magnetic), a read-only memory (ROM) (magnetic), an erasable, programmable, read-only memory (EPROM or Flash memory) (magnetic), an optical fiber (optical), and a portable compact disk read-only memory (CDROM) (optical). Note that the computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

Figure 6:
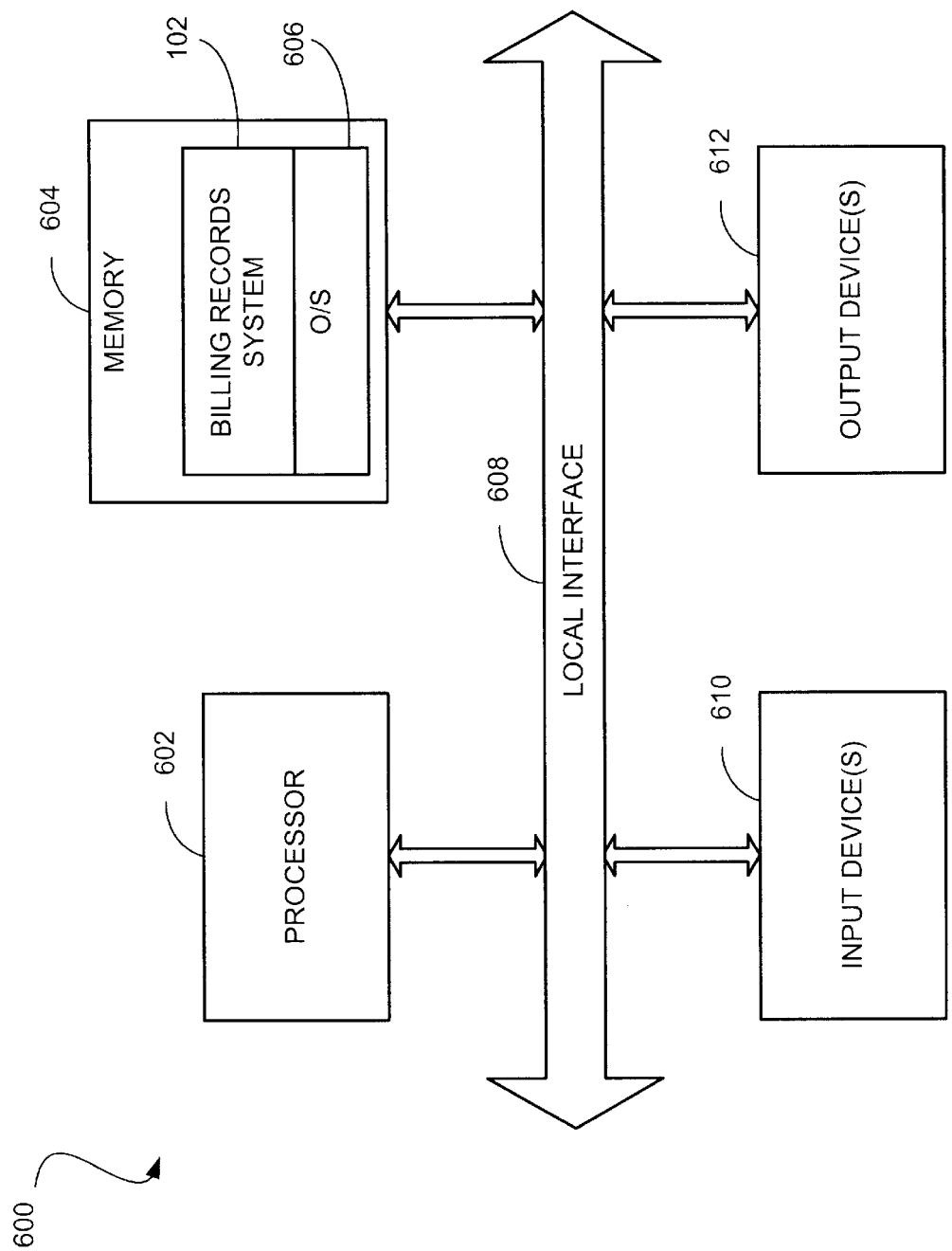
FIG. 6 is a schematic diagram depicting a computer or processor-based system which may be utilized in a preferred embodiment of the present invention.

FIG. 6 illustrates a typical computer or processor-based system 600 which may facilitate functionality (described in detail hereinafter) of the billing system 100 and, in particular, the billing records system 102 of the present invention. As shown in FIG. 6, a computer system 600 generally comprises a processor 602 and a memory 604 with an operating system 606. Herein, the memory 604 may be any combination of volatile and nonvolatile memory elements, such as random access memory or read only memory. The processor 602 accepts instructions and data from memory 604 over a local interface 608, such as a bus(es). The system also includes an input device(s) 610 and an output device(s) 612. Examples of input devices may include, but are not limited to, a serial port, a scanner, or a local access network connection. Examples of output devices may include, but are not limited to, a video display, a Universal Serial Bus, or a printer port. Generally, this system may run any of a number of different platforms and operating systems, including, but not limited to, HP-UX™, Linux™, Unix™, Sun Solaris™ or Windows NT™ operating systems. The billing records system 102 of the present invention, the functions of which shall be described hereinafter, resides in memory 604 and is executed by the processor 602.

Figure 7:
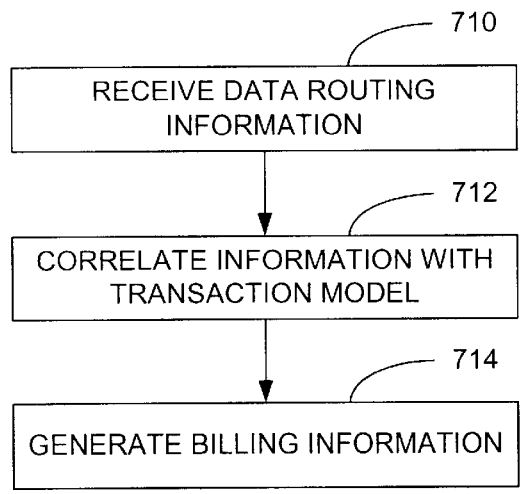
FIG. 7 is a flow chart depicting functionality of a preferred embodiment of the present invention.

The flowchart of FIG. 7 depicts the functionality and operation of a preferred implementation of the billing records system 102 depicted in FIG. 6. In this regard, each block of the flowchart represents a module segment or portion of code which comprises one or more executable instructions for implementing the specified logical function or functions. It should also be noted that in some alternative implementations the functions noted in the various blocks may occur out of the order depicted in FIG. 7. For example, two blocks shown in succession in FIG. 7 may, in fact, be executed substantially concurrently where the blocks may sometimes be executed in the reverse order depending upon the functionality involved.

As depicted in FIG. 7, preferred functionality of the billing record system may be construed as beginning at block 710 where routing information corresponding to routing of data via a communications network is received. Such routing information may correspond to the particular route utilized by a communications network in delivering one or more packets of data as well as other information pertaining to differentiated services provided along the particular route utilized. Thereafter, such as depicted in block 712, the information received may be correlated with a transaction model and, then, such as depicted in block 714, billing information may be generated. Such billing information may be provided in the form of billing detail records, for example.

As described hereinbefore in relation to FIGS. 3 and 4, switch and router information is received by one or more switch information and router information devices, respectively. The switch information and router information devices preferably are communicatively coupled to the billing records system so that they may provide switch and router information, respectively, to the billing records system for processing. Preferably, the aforementioned devices are configured as computer or processor-based devices, such as depicted in FIG. 6, for example, and, much like the billing records system, may provide functionality that may be implemented in hardware, software, firmware or combinations thereof. In this regard, reference will now be made to FIGS. 8 and 9 which depict preferred functionality of the switch information and router information devices.

Figure 8:
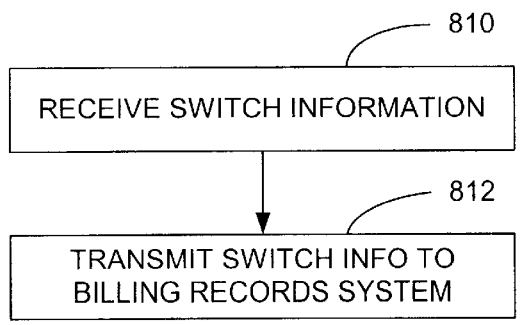
FIG. 8 is a flow chart depicting functionality of a preferred switch information subsystem of the present invention.
Figure 9:
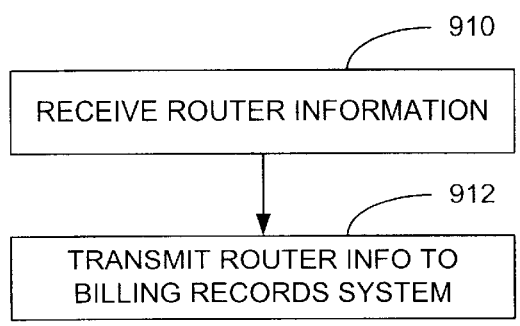
FIG. 9 is a flow chart depicting functionality of a preferred router information subsystem of the present invention.

As depicted in FIG. 8, functionality of a representative switch information device may be construed as beginning a block 810 where switch information is received from switches associated therewith. Thereafter, such as depicted in block 814, the switch information may be transmitted to an appropriate billing records system. Similarly, as depicted in FIG. 9, functionality of a representative router information device may be construed as beginning a block 910 where router information is received from routers associated therewith. Thereafter, such as depicted in block 914, the router information may be transmitted to an appropriate billing records system.

The foregoing description has been presented for purposes of illustration and description. It is not intended to be exhaustive or to limit the invention to the precise forms disclosed. Modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. A method for billing use of a communications network, the communications network being configured to enable communication between sources and destinations and being adapted to provide differentiated services to users thereof such that data communicated from a first user is routed at a higher priority than data communicated from a second user, the higher priority corresponding to at least one of a higher data transfer rate, a higher reliability of data transfer, a lower latency of data transfer, and a lower loss rate of data from a respective source to a corresponding destination, said method comprising:

receiving routing information corresponding to routing of data via the communications network;

correlating the routing information with a transaction model, the transaction model comprising at least one billing formula configured to assess communications network utilization by the first user based upon correlating the actual routing of data of the first user via the communications network with the differentiated service to be provided to the first user by the communications network; and generating billing information based upon the routing information correlated with the transaction model such that the billing information includes a billing amount to be charged to the first user for using the communications network;

wherein, in generating the billing information, the billing amount is increased if the actual data transfer rate of data associated with the first user is higher than the data transfer rate corresponding to the differentiated service that the communication network is to provide to the first user.

2. The method of claim 1, wherein the communications network comprises class routers communicatively coupled to each other, each of the class routers being adapted to receive data from multiple sources and transmit the data received from each source in accordance with the differentiated service of the user corresponding to the data, and wherein receiving routing information comprises receiving router information corresponding to the class routers utilized while routing the data via the communications network.

3. The method of claim 2, wherein the transaction model comprises at least one billing formula, the billing formula being configured to assess communications network utilization by a user based upon actual routing of data of the user via the communications network.

4. The method of claim 3, wherein at least one of the class routers is associated with a first service provider, and wherein generating billing information comprises generating billing information based upon the router information corresponding to the at least one of the class routers of the first service provider.

5. The method of claim 3, wherein the communications network comprises switches communicatively coupled to each other, and wherein receiving routing information comprises receiving switch information corresponding to the switches utilized while routing the data via the communications network.

6. The method of claim 5, wherein the at least one billing formula is configured to assess communications network utilization by a user based upon correlating the actual routing of data of the user via the communications network with the differentiated service to be provided to the user by the communications network.

* * * * *